United States Patent
Pfeiffer

[15] 3,635,626
[45] Jan. 18, 1972

[54] HEATING PLATEN PRESS

[72] Inventor: Heinrich Pfeiffer, Eppingen Baden, Germany

[73] Assignee: F. Dieffenbacher, GmbH Maschinenfabrik, Eppingen/Baden, Germany

[22] Filed: Oct. 25, 1968

[21] Appl. No.: 770,526

[30] Foreign Application Priority Data

Oct. 28, 1967 Germany..................P 16 53 186.5

[52] U.S. Cl..............................425/136, 100/99, 100/93 P, 100/257, 200/46, 425/141
[51] Int. Cl........................................................B29c 3/06
[58] Field of Search...............18/16 C, 16 P, 16 R, 17 H, 18/17 C, 17 E, 17 R; 100/257, 99, 93 P; 214/65, 16.6

[56] References Cited

UNITED STATES PATENTS

| | | |
|---|---|---|
| 2,938,236 | 5/1960 | Martin...........................100/257 UX |
| 3,089,188 | 5/1963 | Hoffmann...........................18/16 C |
| 3,206,800 | 9/1965 | Müller...........................18/16 P X |
| 3,333,447 | 8/1967 | Alspaugh...........................100/257 |
| 3,453,950 | 7/1969 | Pfeiffer...........................100/93 P |
| 3,511,177 | 5/1970 | Schiff...........................18/16 R X |
| 3,418,689 | 12/1968 | Buchheit...........................18/16 R |

Primary Examiner—J. Spencer Overholser
Assistant Examiner—Ben D. Tobor
Attorney—Curt M. Avery, Arthur E. Wilfond, Herbert L. Lerner and Daniel J. Tick

[57] ABSTRACT

Heating platen presses provided with spacer structure for determining the thickness to which the work material is pressed. Such platen press normally includes a stationary base and a movable press assembly coacting with the base to compress the work material. In order to determine the thickness to which the work material is compressed, so as to form chipboard, shavings board, fiberboard, or other composition board of selected thickness, spacer means of a suitable thickness is provided. In order that there may be no error in the use of a particular spacer means a testing means is provided for testing the thickness of the particular spacer means which is used.

14 Claims, 15 Drawing Figures

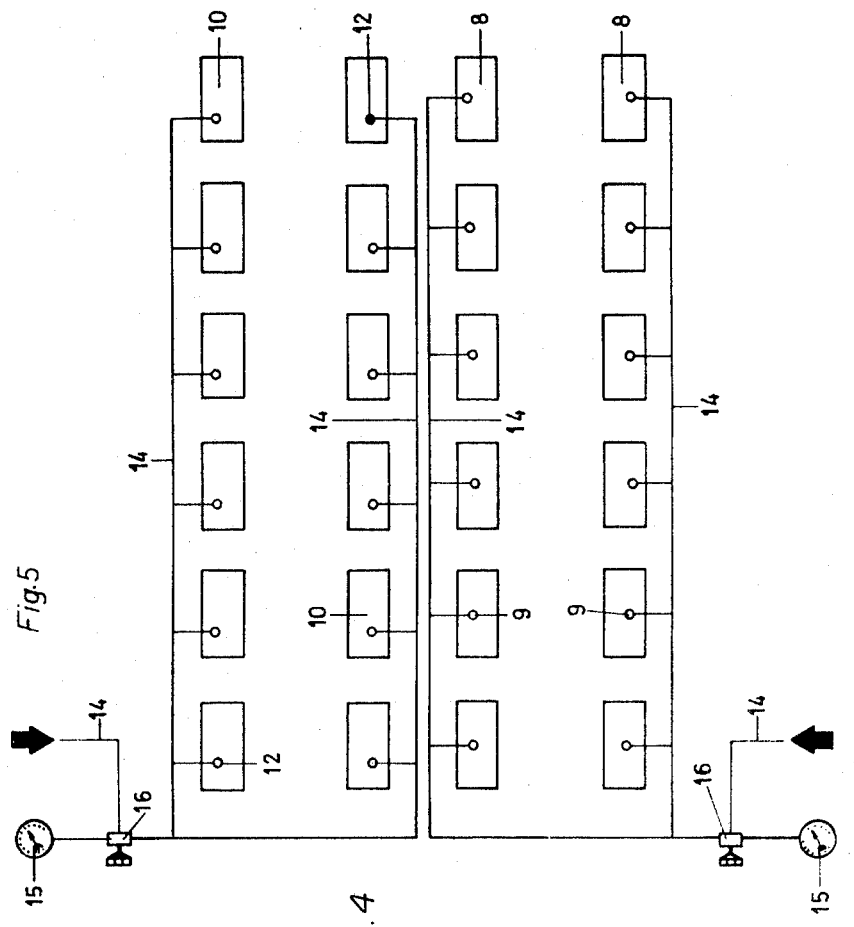
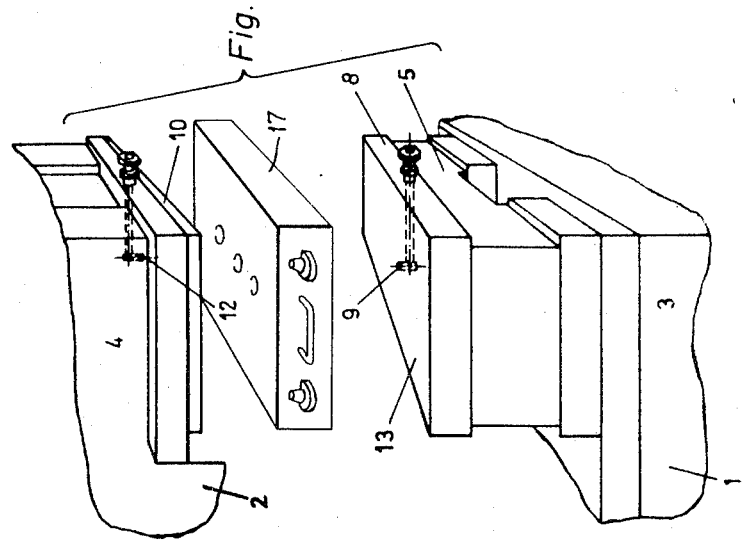

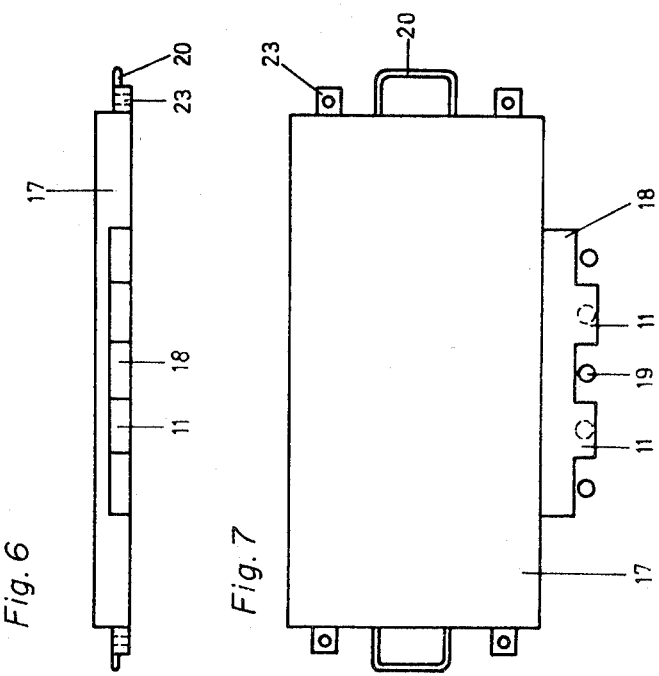

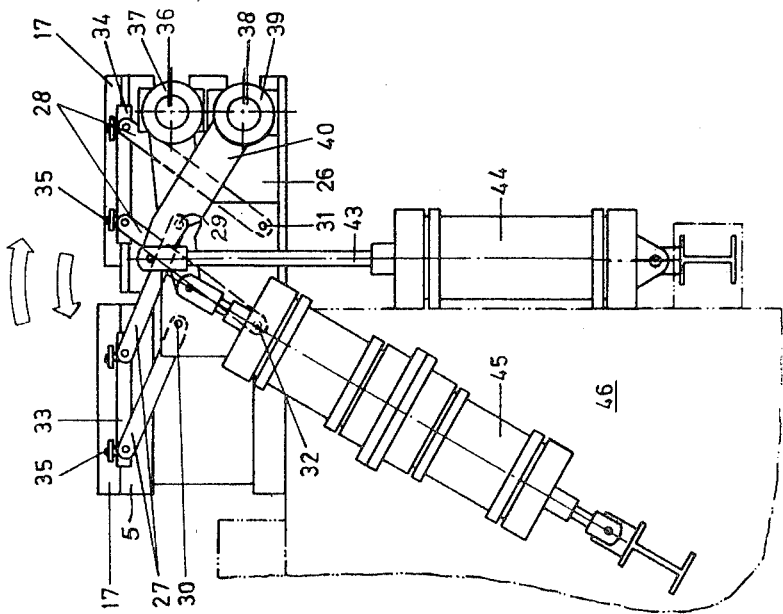
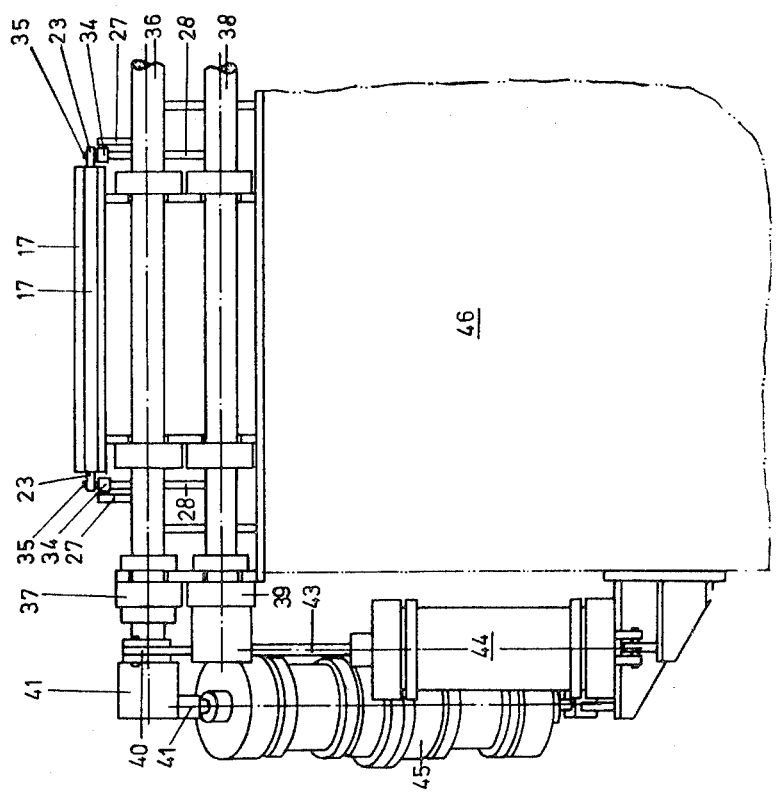

HEATING PLATEN PRESS

My invention relates to heating platen presses.

In particular, my invention relates to the interchangeable spacer structure which is used with the stationary base and movable press assembly of such presses in order to determine the thickness to which the work is compressed.

Such heating platen presses are used in the manufacture of composition board, which may be chipboard, shavings board, fiberboard, or the like. Such heating platen presses take the form of single-opening presses or multidaylight presses. With structures of this type it is customary to situate between the press plates inserts or spacer strips the thickness of which will determine the thickness to which the work material is pressed. Such spacer strips are customarily situated along the edges of the material which is compressed or in grooves of the platens. With a relatively new type of construction, the thickness to which the work is compressed is determined by spacer members and spacer plates of large area carried by walls of the base and movable press assembly situated beyond the region where compression of the work material takes place. In this latter type of construction the location of the spacer means is displaced with respect to the region where the work is compressed in such a way that the spacer means is situated beyond the zone where it can be undesirably engaged by foreign matter derived from the work material.

During interchanging of one spacer means for another, which requires an entire group of spacer elements to be replaced by another group of a different thickness, it can easily happen that at one or more locations a spacer element of improper thickness is used. Upon repeated press operations under these latter conditions, considerable damage to the entire structure of the press can result. In addition, the quality of the work necessarily suffers under these conditions.

A further disadvantage of the known arrangements for interchanging spacers is that these interchanging operations are in general always carried out by hand, so that they require an undesirably long time and undesirably high labor cost.

It is accordingly a primary object of my invention to provide a construction which will avoid the above drawbacks by reliably guaranteeing that only spacer elements of equal thickness are situated in the press at any one time.

A further object of my invention resides in the provision of a structure which will enable one spacer means to be interchanged with another in an extremely rapid and convenient manner.

In accordance with my invention a testing means is provided for testing the thickness of spacer elements which preferably are in the form of plates of large area, and at the same time providing, for the purpose of interchanging one group of spacer elements for another, a suitable drive which actuates a swing structure capable of swinging the previously used spacer means away from the press while simultaneously swinging the replacement spacer means to an operative position thereon.

In accordance with my invention the testing means for checking the thickness of the spacer means can take the form of either a pneumatic installation or of an electrical code system.

With the pneumatic type of testing means, a protective plate which coacts with the spacer plate is formed with an opening which is connected with a pneumatic conduit so that air can be directed through this opening.

Upon situation of a new set of spacer plates on spacer members which carry the latter, the movable press assembly is lowered without applying any pressure to the work material, and then the spacer plates will be engaged by the components which determine the thickness of the work material. Now the compressed air is directed through the openings of the protective plates, so as to indicate whether or not all of the spacer plates have the same thickness. In the event that all of the spacer plates do not have the same thickness, it will be possible for the compressed air to flow out along a spacer plate, and a pressure gage will indicate that there is no pressure or an extremely low pressure, thus giving a signal to the operator that something is wrong with the spacer means. On the other hand, where the gage indicates a full pressure, the operator will know that all of the bores or openings to which the pressure is directed are blocked by the spacer plates, so that these plates are indeed of the proper thickness.

According to the electrical testing system, a code is used for indicating whether the spacer plates have the proper thickness. Along the longer side of each spacer plate there is an index strip the configuration of which is indicative of the thickness of the plate. Thus, this index strip will be formed with notches between which projections are located. Electrical switch components coact with the index strip to be actuated or not actuated depending upon whether the location of the notches and projections of the index strip match the location of the switch-actuating components. In the event that an improper spacer plate has been included in the press, the electrical structure will be actuated so as to block the supply of high pressure to the press.

According to a further feature of my invention the testing is provided in connection with a semiautomatic interchangeability of the spacer plates. With this arrangement the next set of spacer plates which are to be introduced into the press are preliminarily supported on a suitable support structure situated outwardly beyond the press. This latter support structure is situated so as to locate the new set of spacer plates at the same elevation as the set which is in use. In accordance with my invention a pair of parallelogram linkages respectively coact with the old set of spacer plates and the new set for interchanging one set with the other, and one of the parallelogram linkage means has links which are shorter than the other with the links being positioned so as not to interfere with each other, so that it becomes possible through a suitable pair of drives operatively connected with the pair of parallelogram linkages to swing the latter so as to bring about replacement of the old set of spacer plates with a new set. With an arrangement of this type, it is possible to maintain the parallelogram linkage which has the shorter links in an intermediate position while the linkage with the longer links can then displace a set of spacer plates between the support and operating positions thereof, or these operations can be reversed. In order to properly position the spacer plates on the interchanging structure, the latter is provided with suitable centering pins received in eyes or the like of the spacer plates.

In order to guarantee that the spacer plates are properly seated on the spacer members which carry the same, the centering pins are provided for determining the horizontal positions of the spacer plates while presenting no resistance to vertical movement thereof. For this purpose the centering pins are lowered a few millimeters by the interchanging means after the spacer plates have been situated on their supports. In this way also the transmission of any pressure from the press to the structure which interchanges the sets of spacer plates is avoided.

A further feature of my invention resides in providing plates which engage the spacer plates with openings communicating with a source of compressed air. After one set of spacer plates has been interchanged with another, the compressed air can be used to check whether all of the spacer plates are seated properly.

It is of advantage if these openings in the plates which coact with the spacer plates are used when the press is open does not have any spacer plates in order to blow out the structure with the pneumatic assembly. In order to clean the spacer plates with the compressed air it is also possible to use the openings of the other plates through which the compressed air is directed either when the press is fully open or when it is partly closed.

The particular advantages which are achieved with my invention reside in the fact that any possible damage to the press is avoided and also in the fact that a reduction in the quality of the work material, which would result from the use of improper spacer elements is avoided.

A further advantage of my invention resides in the fact that the structure and arrangement of the components which interchange one set of spacer plates for another enables a preliminary positioning of the spacer means beyond the press itself to be carried out so that by way of the electrical code-type of testing means, for example, it is possible to be absolutely sure that a correct set of spacer elements is in readiness for production of the next boards which will have a different thickness determined by the new set of spacer plates, and of course this structure guarantees proper swinging of the new set of spacer plates into and the old set of spacer plates out of the machine.

My invention is illustrated by way of example in the accompanying drawings which form part of this application and in which:

FIG. 4 is a fragmentary perspective illustration illustrating in exploded view the coaction between the protective plate and spacer plate supporting member both of which are formed with bores or openings of the testing means;

FIG. 5 is a schematic illustration of the compressed air circuit communicating with the openings of components such as those shown in FIG. 4;

FIG. 6 is a side elevation of one embodiment of a spacer plate;

FIG. 7 is a top plan view of the plate of FIG. 7;

FIGS. 13 and 14 are fragmentary front and side elevations of the structure for interchanging one set of spacer plates for another.

Figure 2:
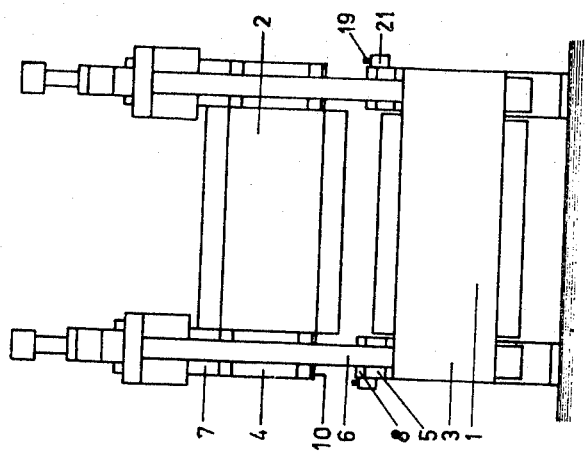
FIG. 1 and 2 are schematic end and side elevations of a heating platen press provided with the structure of my invention.
Figure 1:
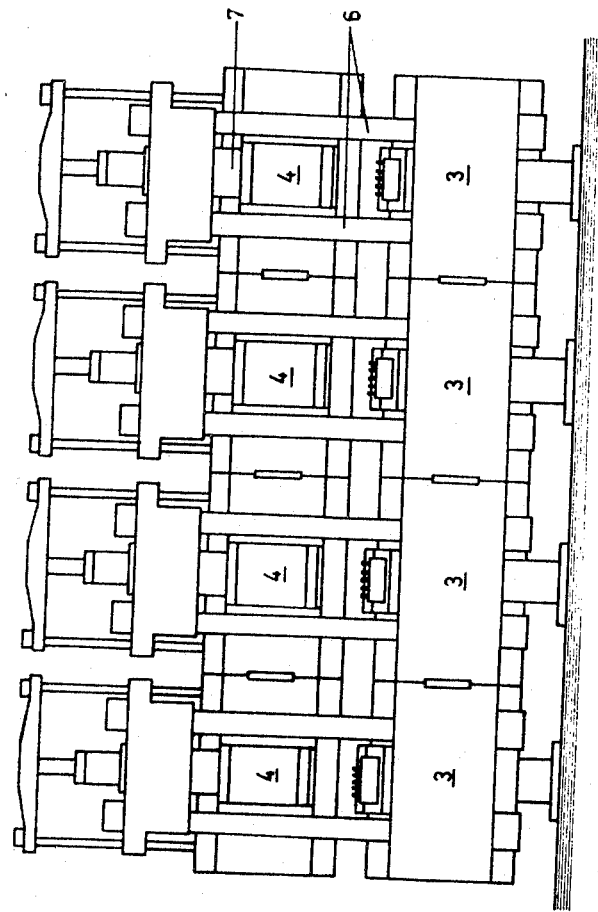
Figure 3:
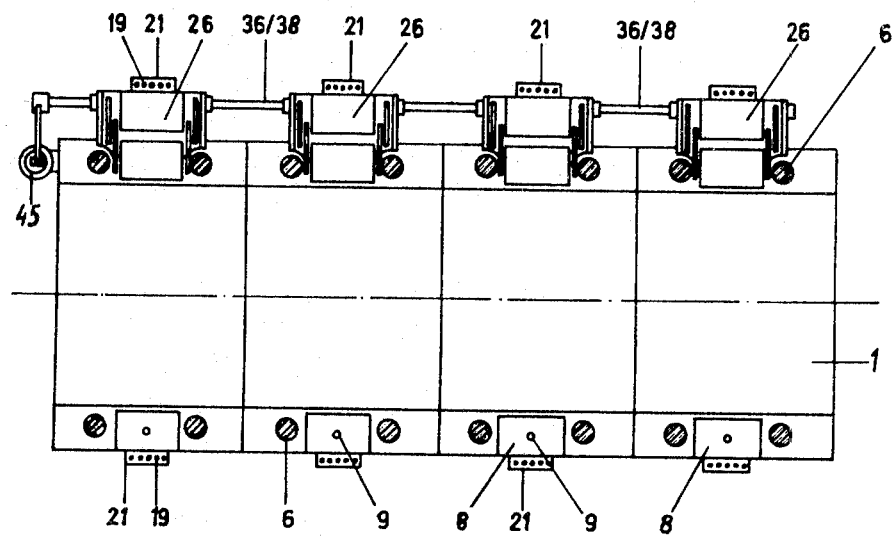
FIG. 3 is a partly sectional plan view of the press of FIG. 1 having the spacer means interchanging structure arranged along a longitudinal side of the press and having an electrical code-type of testing means shown at one of the long sides of the press carried by support structure for the spacer means and at the other side of the press for the part of the spacer means itself.

FIGS. 1-3 clearly illustrate how a testing means of an electrical code-type coacts with the spacer supports 5 and the supports 26 for the spacer means, the electrical code-type of testing means 21 being shown connected with both types of arrangement in FIG. 3 in particular. Also, FIG. 3 shows along one side of the press the arrangement of the structure for interchanging one set of spacer plates with another.

With the relatively new type of heating platen press shown, the determination of the thickness to which the work material is compressed is brought about not by spacer strips but by spacer plates of large area which are supported on spacer supports 5, the latter supports being carried by the walls 3 of the base units at a location displaced beyond the compression region, these walls 3 coacting with the walls 4 of the movable press assemblies 2. The walls 4 as well as the spacer supports 5 are situated between pair of tension columns 6 along the axes of the drive pistons 7.

FIGS. 4 and 5 illustrate the top plates 8 of the spacer supports 5 respectively formed with openings in the form of bores 9, and the movable press assemblies 2 are provided at their extensions 4 with protective plates 10 also formed with openings in the form of bores 12. Through suitable valves 16, a source of compressed air is capable of directing the compressed air through the conduit system 14 which communicates with the openings 9 and 12, so that in this way it is possible to test whether spacer plates 17 (FIGS. 7 and 8) of equal thickness have been situated at all parts of the press. In order to make this test it is necessary to lower the movable press units to 2 until the spacer plates 17 close the openings 12 of the protective plates 10.

If all of the spacer plates 17 are of equal thickness and rest properly on the upper surfaces of the plates 8, then it is not possible for the compressed air to flow through the openings 12 and the pressure of the compressed air acts fully upon the gages 15, blocking or releasing the high pressure by means of a suitable contact.

A check as to whether or not all of the plates 17, which form the spacer means, rest properly upon the surfaces 13 can also be carried out with the compressed air.

Thus, the compressed air will flow through the valves 16 to the individual plates 8 of the spacer supports 5. If all of the spacer plates 17 properly rest upon the supports 5 covering the surfaces 13 thereof, without any foreign body situated between a spacer plate and the support, for example, then it will not be possible for the compressed air to flow out through the openings 9, and the pressure gages will give an indication of full pressure in the conduit system 14. Of course, both of these latter tests can be carried out by sucking air through the openings rather than forcing compressed air out of the latter.

FIGS. 6, 7, 10 and 11 illustrate how it is possible to provide a testing means in the form of an electrical code system having five code elements capable of being combined in various ways. This can be brought about, as shown in the FIGS. 6 and 7, by providing along one edge of each spacer plate 17 an index strip 18 formed with notches which define between themselves projections 11 which, according to the number and arrangement thereof, will cause signals to be provided for indicating whether or not a proper set of spacer plates is used.

Figure 12:
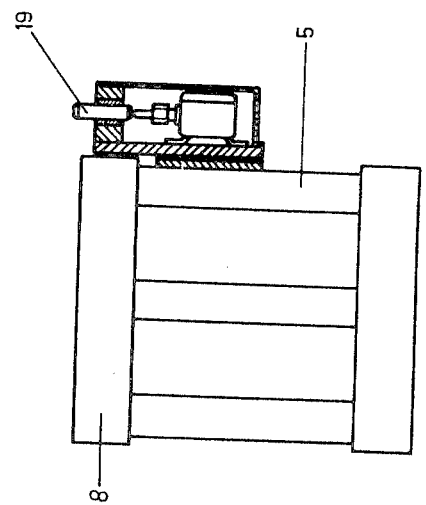
FIGS. 11 and 12 illustrate in a front elevation and partly sectional side view, respectively, the manner in which switch-actuating elements of a limiting switch coact with a spacer member.
Figure 11:
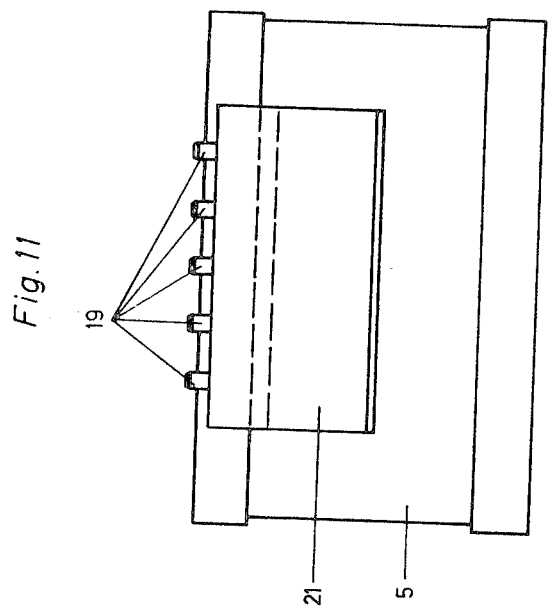

Thus, a given index strip 18 will have a configuration corresponding to a predetermined thickness of a spacer plate, and an entire set of such spacer plates will be respectively provided with identical index strips 18. When such a spacer plate as shown in FIGS. 6 and 7 is situated on the support means 5 of FIG. 1, the projections 11 will extend outwardly beyond the support to depress predetermined switch-actuating members 19 (FIGS. 11 and 12), these switch components forming part of a limit switch 21 which will close a predetermined circuit upon a given actuation of the switch-actuating elements 19.

If all of the spacer plates 17 which form the spacer means have identical code elements, respectively, so that they are all of the same thickness, then the electrical circuitry will release the high pressure required for the next press operation. However, if one or more spacer plates 17 having a different code and situated at one or more locations of the press, an optical or acoustic signal is provided while the source of high pressure remains blocked. It is to be noted in this connection that it is of advantage to provide only through identical index strips 18 an indication of the thickness and a determination of different thicknesses, since such a system is far more reliable than a system which evaluates the actual thickness of a set of spacer plates.

Figure 10:
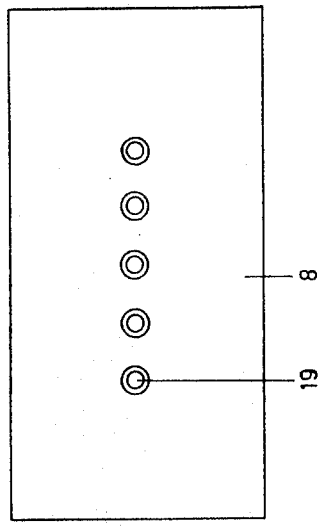
FIG. 10 illustrates how switch-actuating members of a limiting switch coact with a spacer plate.
Figure 9:
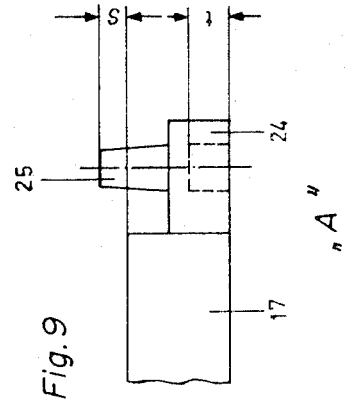
FIG. 9 illustrates details of a centering pin and eye combination of a spacer plate.
Figure 8:
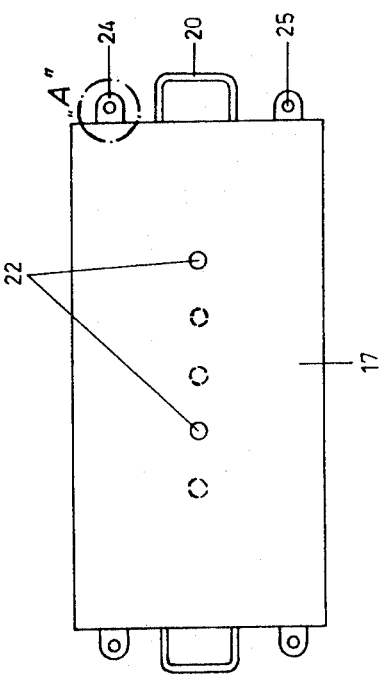
FIG. 8 illustrates the manner in which code bores are formed in another embodiment of a spacer plate.

According to FIGS. 8 and 10, instead of providing index strips, each spacer plate is formed with a series of bores 22 capable of receiving a corresponding series of switch-actuating elements 19 carried by the plate 8 of the spacer support 5. With this arrangement the high pressure is released or a warning signal is given depending upon whether or not a switch-actuating element 19 is depressed. Such a depression will take place when the series of elements 19 do not match with the bores 22 which respectively receive the elements 19 when a plate 17 is mounted on the plate 8.

FIGS. 6-9 illustrate further details of each spacer plate of the spacer means, and in particular details used in connection with transporting of the plates 17 into the press by way of a semiautomatic interchanging structure.

In accordance with whether the support for the spacer plate at the interchanging structure has bores or cutouts or centering pins, each spacer plate will be provided at its side region with eyes 23 or with downwardly extending centering pins (not illustrated).

In order to combine two or more spacer plates into a spacer assembly having a total thickness equal to the sum of the individual thicknesses of the spacer plates, a plurality of the spacer plates may be stacked one upon the other, and for this purpose each spacer plate will have upwardly extending centering pins 25 (FIG. 9) and downwardly directed eyes 24. The centering pins 25 extend upwardly beyond each spacer plate by the distance $s$ indicated in FIG. 9, and this distance is less than the depth $t$ of the bore of each eye no. 24. Thus, each plate can rest reliably on the next lower plate while being horizontally positioned by the coaction of elements 24 and 25.

In order to facilitate handling the spacer plate 17 which may have a fairly substantial weight, the plates are provided with handles 20, so that they can be easily transported.

Figure 15:
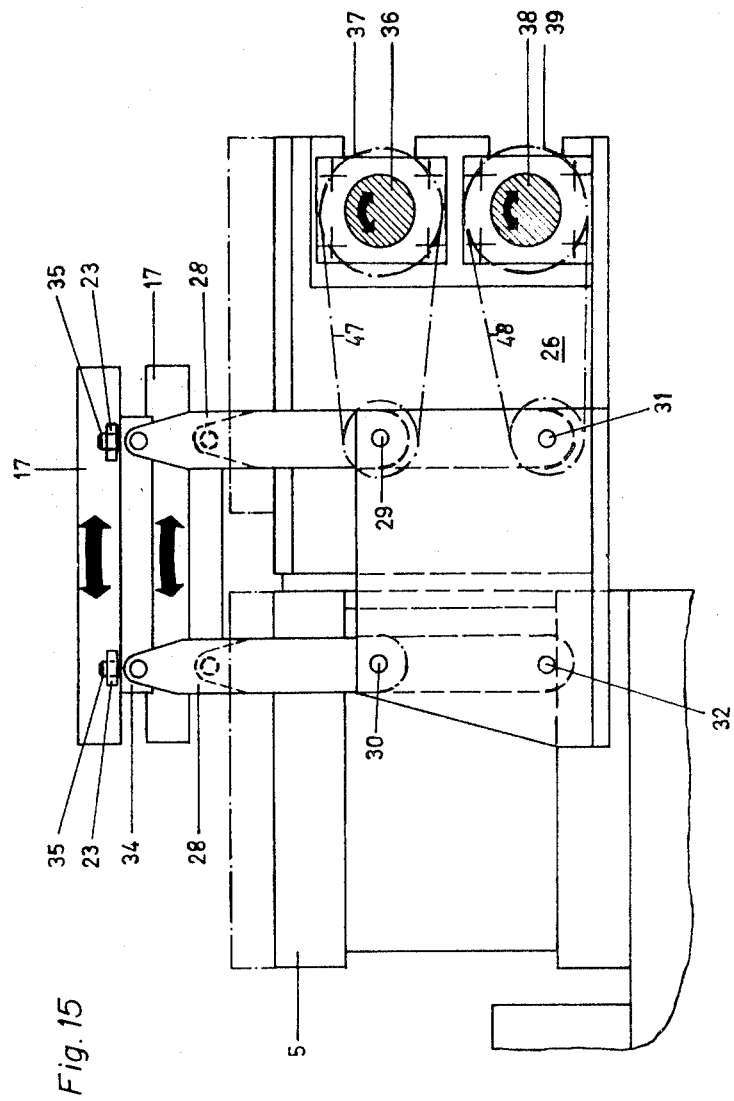
FIG. 15 shows the parts of FIGS. 13 and 14 with the spacer plates carried thereby held at an intermediate position.

FIGS. 13-15 illustrate the structure for interchanging one set of spacer plates for another, particularly for the case where the next set of spacer plates are initially positioned before being interchanged with the old set. In this way the preliminary positioning of the new set of spacer plates can take place while pressing operations with the old set. With an arrangement of this type, the testing of the spacer means to determine that a proper space means is being used, can take place by way of an electrical code system, for example, in accordance with my invention, at a location beyond the operating region of the press, thus enabling the old spacer means to be removed and the new spacer means to be introduced in the fastest possible time and in the most convenient manner.

For this purpose, each spacer support 5 is connected with an outwardly directed support 26, capable of supporting a new spacer plate 17 at the same elevation as the old plate carried by the support 5. The support means 26 will situate the new spacer means at the same plane as and will support the new spacer means in the same way that the spacer supports 5 respectively support the old spacer plates.

Thus, after positioning a new set of spacer plates on the support components 26, with simultaneous centering of the new set of spacer plates by receiving in the eyes 23 thereof, the centering pins of a pair of swing structures which form the interchanging means, the electrical code system can be used to test whether the new spacer means corresponds to the required code.

The changing of one spacer means by another takes place by the actuation of swingable parallelogram linkages, a pair of these linkages being respectively driven by a pair of pneumatic drives formed by structures which include the pneumatic cylinders 44 and 45.

At each side of a support 26 there are a pair of parallelogram linkages, namely the linkages formed by elements 27 and 33 and the linkages formed by elements 28 and 34. The shorter links 27 respectively have pivots 29 and 30, while the longer links 28 have pivots 31 and 32. The pivots 29 and 30 are respectively situated over the pivots 31 and 32 while the latter are longitudinally offset with respect to the former so that the links 28 can swing behind the links 27 without interfering therewith. Thus, the outer links 27 will raise the plates 17 carried thereby at the interconnecting link 33 to an elevation higher than the elevation to which the plates 17 are raised by the parallelogram linkage 28, 34.

Each swingable parallelogram linkage is driven by its own drive means, and for this purpose a rotary drive shaft 36 is operatively connected with the links 27 while a rotary drive shaft 38 is operatively connected with the links 28. The rotary movement of the drive shaft 36 is transmitted by way of a sprocket wheel 37 and the rotary movement of the shaft 38 is transmitted by way of a sprocket wheel 39. These sprocket wheels respectively coact with chains 47 and 48 for transmitting the rotary movement to the rotary pivots 29 and 31 which thus bring about the swinging movement of the parallelogram linkages. The drive shaft 38 is driven by a lever 40 affixed thereto and forming a crank arm pivotally connected with a piston rod 43 extending from the piston which is in the pneumatic cylinder 44. In the same way, the cylinder 45 has the piston therein connected with a piston rod and lever assembly 41 connected to the drive shaft 36 for turning the latter. Thus, the pneumatic drives can be actuated for simultaneously turning the drive shafts 36 and 38 in opposed directions to bring about opposed swinging movements of the parallelogram linkages and thus simultaneous displacement of the two spacer means in opposed directions as shown by the arrows in FIGS. 14 and 15.

During interchanging of one set of spacer plates for another, when the press is open the parallelogram linkage 27, 33 will be actuated to hold the spacer plates carried thereby at an intermediate position corresponding approximately to that shown in FIG. 15 while the other parallelogram linkage 28, 34 will displace the new set of spacer plates 17 unto the supports 5, and of course the next interchanging of spacer plates takes place with the reverse of these operations, the movement of the linkages 27, 33 in this particular case being continued after the new set of spacer plates have been transported to their operating positions, so that the supports 26, 10 temporarily carry the old set of plates which can be removed and replaced by the next set.

I claim:

1. In a heating platen press, a stationary base and a movable press assembly coacting therewith, interchangeable spacer means coacting with said base and movable assembly for determining the thickness to which the work material is pressed, and testing means coacting with said spacer means for testing the thickness thereof, said testing means including an electrical code system which responds or does not respond depending upon whether or not proper spacer means are used.

2. The combination of claim 1 and wherein said spacer means includes a plurality of spacer plates each having along one edge an elongated strip formed with notches and forming part of said testing means, the latter including a limit switch having a plurality of switch-actuating members coacting with said notches and with the projections of said strip remaining between the said notches to provide a signal in the event that an improper spacer plate has been used.

3. The combination of claim 1 and wherein said spacer means includes a plurality of spacer plates each formed with a series of bores extending partly through said spacer plate from one side thereof, a spacer member supporting each spacer plate and having a series of switch members extending upwardly from said spacer member to be received in said bores of said spacer plate, said switch members and bores forming said testing means and coacting so that if the switch members do not match with said bores to be received therein, at least one of the switch members will be actuated to give a signal that an improper spacer plate is used.

4. In a heating platen press, a stationary base and a movable press assembly coacting therewith, interchangeable spacer means coacting with said base and movable assembly for determining the thickness to which the work material is pressed, testing means coacting with said spacer means for testing the thickness thereof, a second spacer means provided to be interchanged with the first-mentioned spacer means, a pair of parallelogram linkages respectively coacting with the two spacer means, and a pair of drives respectively actuating the latter to replace one of the spacer means with the other.

5. The combination of claim 4 and wherein a support means is provided for the second spacer means for holding the latter at the same elevation as the first-mentioned spacer means if in readiness to be interchanged therewith.

6. The combination of claim 5 and wherein said testing means is situated at least in part at said support means for said second spacer means for testing the latter.

7. The combination of claim 5 and wherein one of said parallelogram linkage means has links longer than the other and the pivot axes of the links of both said parallelogram linkages being parallel but situated at different elevations while being longitudinally offset.

8. The combination of claim 4 and wherein a plurality of said drives and parallelogram linkages are distributed about the press with one set of drives and linkages being situated along each longer side of the press.

9. The combination of claim 4 and wherein each drive means includes a pneumatic piston-and-cylinder assembly and a lever actuated thereby operatively connected to a parallelogram linkage for actuating the latter.

10. The combination of claim 1 and wherein said spacer means includes a plurality of spacer plates, and a positioning means coacting with each plate for properly positioning the latter, said positioning means including centering pins and elements formed with openings to receive said pins.

11. The combination of claim 10 and wherein the openings which receive said pins have a depth greater than the length of the pins.

12. The combination of claim 1 and wherein said spacer means includes a plurality of spacer plates, and means fixed with said plates for facilitating the carrying and transportation thereof.

13. The combination of claim 1 and wherein the press includes tension columns and a drive piston therebetween and said spacer means including a plurality of spacer plates, a plurality of spacer members being provided for supporting said plates at locations between said columns along the axis of said piston.

14. The combination of claim 13 and wherein each spacer plate has a rectangular configuration and a ratio between its length and width which is smaller than 3:1, preferably smaller than 2:1, the length of each spacer plate being determined by the distance between the tension columns and the width thereof being determined by the diameter of the driving piston.

* * * * *